(12) United States Patent
Darnell et al.

(10) Patent No.: US 9,545,926 B2
(45) Date of Patent: Jan. 17, 2017

(54) VEHICLE CONTROL SYSTEM AND METHOD FOR SWITCHING BETWEEN POWERTRAIN CONTROL FUNCTIONS

(71) Applicant: Jaguar Land Rover Limited, Whitley Coventry Warwickshire (GB)

(72) Inventors: Paul Darnell, Leamington Spa (GB); Robert Bird, Bromsgrove (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/479,367

(22) Filed: Sep. 7, 2014

(65) Prior Publication Data

US 2015/0073679 A1    Mar. 12, 2015

Related U.S. Application Data

(60) Provisional application No. 61/874,911, filed on Sep. 6, 2013.

(51) Int. Cl.
*B60W 30/18* (2012.01)
*B60W 10/06* (2006.01)
*B60W 10/18* (2012.01)

(52) U.S. Cl.
CPC ........ *B60W 30/18172* (2013.01); *B60W 10/06* (2013.01); *B60W 10/18* (2013.01); *B60W 2520/105* (2013.01); *B60W 2520/125* (2013.01); *B60W 2520/14* (2013.01); *B60W 2520/26* (2013.01); *B60W 2520/28* (2013.01); *B60W 2710/0666* (2013.01); *B60W 2720/28* (2013.01)

(58) Field of Classification Search
CPC .................. B60W 30/18172; B60W 2520/26; B60W 10/06; B60W 10/18; B60W 2520/105; B60W 2520/125; B60W 2520/28; B60W 2710/0666; B60W 2720/28; B60W 2520/14
See application file for complete search history.

(56) References Cited

U.S. PATENT DOCUMENTS

2010/0161188 A1* 6/2010 Turski ..................... B60T 8/175
701/67

* cited by examiner

*Primary Examiner* — Yuen Wong
(74) *Attorney, Agent, or Firm* — Reising Ethington P.C.

(57) ABSTRACT

A system and method for use with a vehicle to provide a vehicle launch assist (VLA) function that reduces wheel slip at lower speeds and to provide a fraction control (TC) function that reduces wheel slip at higher speeds. Each function affects operation of one or more vehicle subsystems that control at least one powertrain parameter. The VLA and TC functions operate in response to a driver accelerator request to generate a drive signal that controls torque delivered to at least one driven vehicle wheel. The VLA function generates the drive signal at a first value that limits the torque to below a requested torque value representing the driver accelerator request. The TC function generates the drive signal at a second value that limits the torque to below the requested torque value. And the control system outputs a powertrain drive signal based on the lesser of first and second values.

21 Claims, 7 Drawing Sheets

VEHICLE CONTROL SYSTEM AND METHOD FOR SWITCHING BETWEEN POWERTRAIN CONTROL FUNCTIONS

FIELD OF THE INVENTION

The present invention relates to a vehicle control system for one or more vehicle subsystems and to a method of controlling one or more vehicle subsystems.

BACKGROUND

Powertrain systems on vehicles provide power to one or more of the vehicle wheels in response to a driver accelerator request such as is received typically in the form of an accelerator pedal input. Vehicle launch assist (VLA) and traction control (TC) functions may be used by the powertrain control system to limit the power (torque) applied in response to the driver input so as to reduce wheel slip between the driven wheel(s) and ground surface over which the vehicle is traveling. A powertrain control system may use a VLA function for low speed operation and sometimes for particular surface terrain conditions, such as when driving on sand. The TC function may then be used for more typical driving speeds and conditions.

In a known TC function, the driver accelerator input is used to generate a filtered torque demand representing the maximum torque to be supplied to the vehicle wheel(s). At lower speeds (e.g., under 5 km/h) and in at least some terrain conditions such as sand, the VLA function is used in lieu of the TC function to limit the maximum torque applied to the wheel(s) to something less than that provided by the TC function under those same conditions. Then, as vehicle speed increases (e.g., past 5 km/h), the VLA function is exited and the powertrain control system switches to TC function. The torque limit used then switches from the maximum allowed by the VLA function to typically a much large value that which would have been available at that point in time from the TC function had it been utilized. This jump is done by factoring out the VLA function influence as it switches to the TC function, which may involve an high rate of torque increase that is undesirable.

In particular, handing over torque control from the VLA function to TC function in this way may result in increasing torque at a rate that exceeds the TC function torque profile for those same conditions. And, where driver torque demand (the driver accelerator request) has gone away by the time the VLA function is being exited, this approach may result in an increasing torque occurring during this transition period even though the drive torque demand has ended.

SUMMARY

In view of the foregoing, it is an object of the invention to improve the maximum torque profile used for operating the vehicle when switching between VLA and TC functions.

In accordance with one aspect of the invention, there is provided a vehicle control system for a motor driven vehicle. The system is operable to carry out a vehicle launch assist (VLA) function for reducing wheel slip at lower speeds and a traction control (TC) function for reducing wheel slip at higher speeds. Each of the functions affect operation of one or more vehicle subsystems that control at least one powertrain parameter. The VLA and TC functions operate in response to a driver accelerator request to generate a drive signal that controls torque delivered to at least one driven wheel of the vehicle. The VLA function uses the driver accelerator request to generate the drive signal at a first value that limits the torque to below a requested torque value representing the driver accelerator request. The TC function uses the driver accelerator request to generate the drive signal at a second value that limits the torque to below the requested torque value. And the control system outputs a powertrain drive signal based on the lesser of first and second values.

In accordance with another aspect of the invention, there is provided a vehicle having the above-identified vehicle control system along with at least one motor coupled to drive at least one wheel. The powertrain control signal is used to control the power provided by the one or more motors to the one or more wheels.

In accordance with a further aspect of the invention, there is provided a method of controlling maximum torque delivered to one or more wheels of a vehicle. The method includes the steps of: calculating a first maximum torque based on a driver accelerator request and on one or more operating conditions of the vehicle; calculating a second maximum torque as a filtered representation of the driver accelerator request; and limiting the torque applied to the one or more wheels based on a comparison of the first and second maximum torques. Aspects of the invention also include a vehicle control system programmed to carry out this method, as well as a vehicle having the vehicle control system and at least one motor coupled to drive at least one wheel, in which the vehicle control system controls the power supplied by the one or more motors to the one or more wheels.

In accordance with yet another aspect of the invention, there is provided an electronic processor for a vehicle that, when operated under software control, controls the maximum torque being delivered to one or more wheels of the vehicle in accordance with the method of: calculating a first maximum torque based on a driver accelerator request and one or more operating conditions of the vehicle; calculating a second maximum torque as a filtered representation of the driver accelerator request; and limiting the torque applied to the one or more wheels based on a comparison of the first and second maximum torques. Another aspect of the invention provides a vehicle that includes the electronic processor.

BRIEF DESCRIPTION OF THE DRAWINGS

One or more embodiments of the invention will now be described, by way of example only, with reference to the accompanying figures in which.

DETAILED DESCRIPTION

Figure 1:
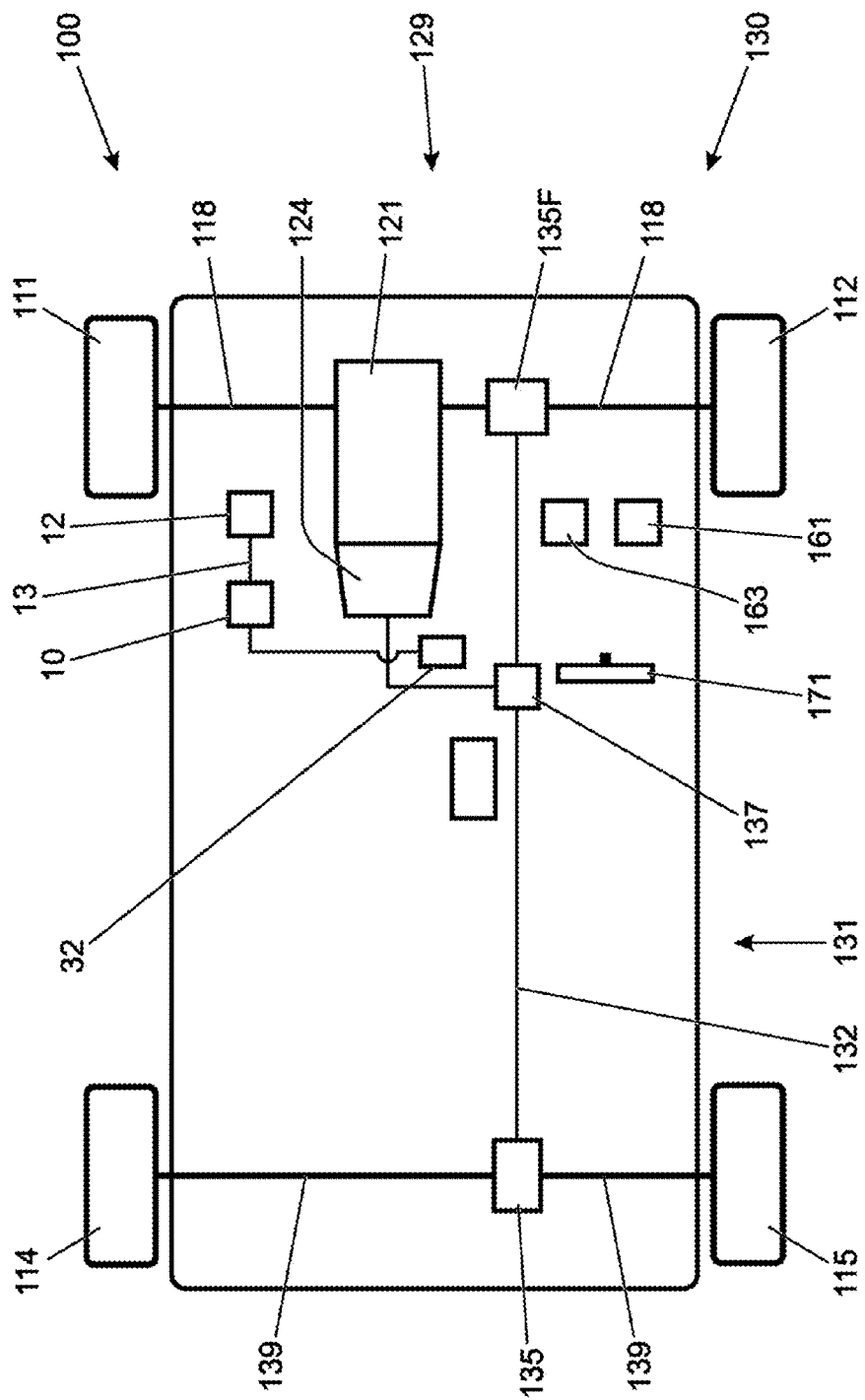
FIG. 1 is a schematic illustration of a vehicle according to an embodiment of the present invention.

FIG. 1 shows a vehicle 100 according to an embodiment of the invention intended to be suitable for off-road use, that is for use on terrains other than regular tarmac road. The vehicle 100 has a powertrain 129 that includes an engine 121 that is connected to a driveline 130 having a transmission 124. In the embodiment shown the transmission 124 is an automatic transmission 124. Embodiments of the present invention are also suitable for use in vehicles with a manual transmission, continuously variable transmission or any other suitable transmission.

The driveline 130 is arranged to drive a pair of front vehicle wheels 111,112 by means of a front differential 135F and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 137, allowing selectable two wheel drive or four wheel drive operation. It is to be understood that embodiments of the invention may be suitable for vehicles having more than four wheels or where only two wheels are driven, for example two wheels of a three wheeled vehicle or four wheeled vehicle or a vehicle with more than four wheels.

The PTU 137 is operable in a 'high ratio' or a 'low ratio' configuration, in which a gear ratio between an input shaft and an output shaft thereof is selected to be a high or low ratio. The high ratio configuration is suitable for general on-road or 'on-highway' operations whilst the low ratio configuration is more suitable for negotiating certain off-road terrain conditions.

The vehicle 100 has a central controller, referred to as a vehicle control unit (VCU) 10. The VCU 10 receives and outputs a plurality of signals to and from various sensors and subsystems 12 provided on the vehicle 100.

Figure 2:
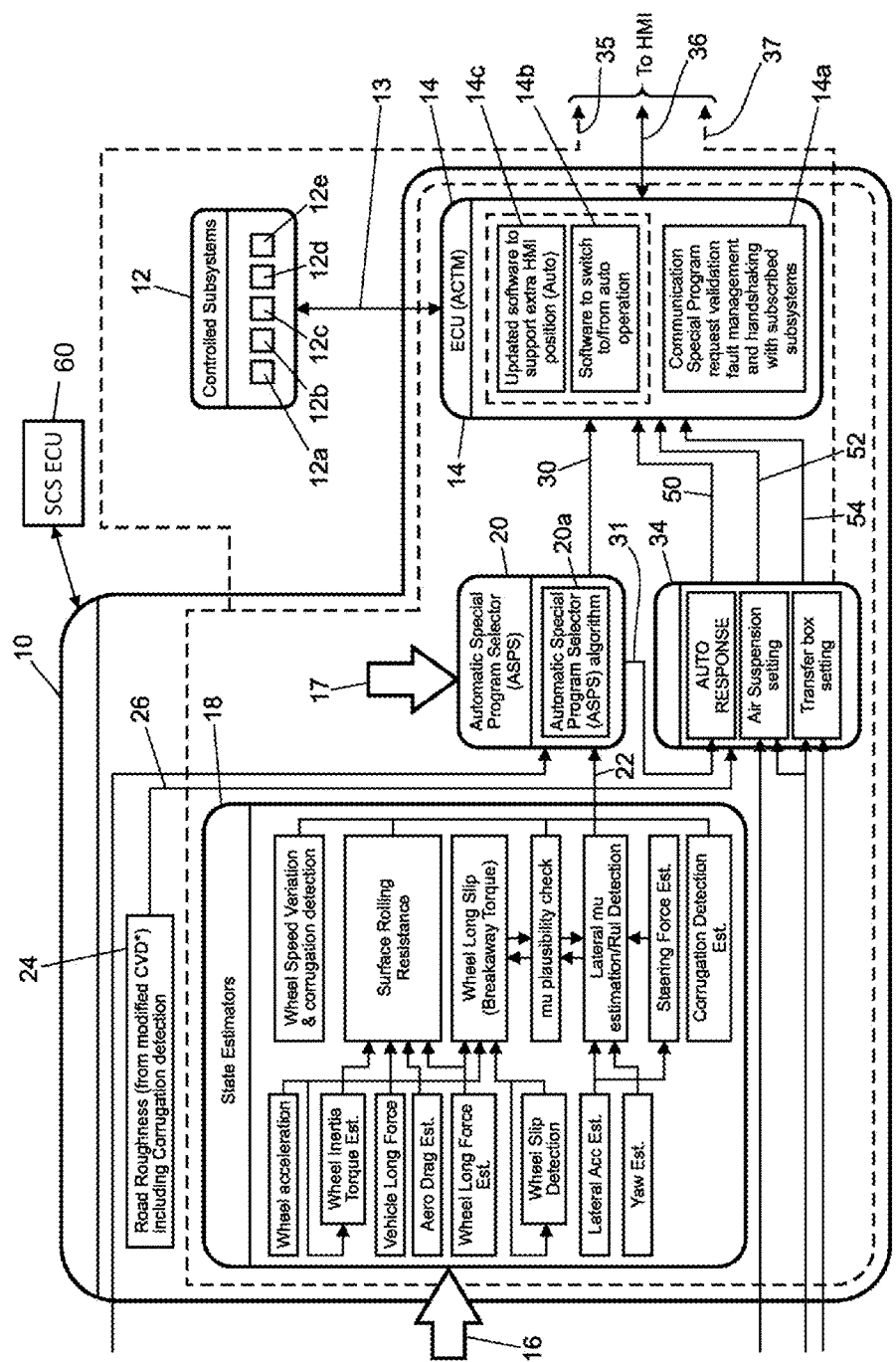
FIG. 2 is a block diagram to illustrate a vehicle control system in accordance with an embodiment of the invention, including various vehicle subsystems under the control of the vehicle control system.

FIG. 2 shows the VCU 10 in more detail. The VCU 10 controls a plurality of vehicle subsystems 12 including, but not limited to, an engine management system 12a, a transmission system 12b, an electronic power assisted steering unit 12c (ePAS unit), a brakes system 12d and a suspension system 12e. Although five subsystems are illustrated as being under the control of the VCU 10, in practice a greater number of vehicle subsystems may be included on the vehicle and may be under the control of the VCU 10. The VCU 10 includes a subsystem control module 14 which provides control signals via line 13 to each of the vehicle subsystems 12 to initiate control of the subsystems in a manner appropriate to the driving condition, such as the terrain, in which the vehicle is travelling (referred to as the terrain condition). The subsystems 12 also communicate with the subsystems control module 14 via signal line 13 to feedback information on subsystem status.

The VCU 10 receives a plurality of signals, represented generally at 16 and 17, which are received from a plurality of vehicle sensors and are representative of a variety of different parameters associated with vehicle motion and status. As described in further detail below, the signals 16, 17 provide, or are used to calculate, a plurality of driving condition indicators (also referred to as terrain indicators) which are indicative of the nature of the condition in which the vehicle is travelling. One advantageous feature of the invention is that the VCU 10 determines the most appropriate control mode for the various subsystems on the basis of the terrain indicators, and automatically controls the subsystems accordingly.

The sensors (not shown) on the vehicle include, but are not limited to, sensors which provide continuous sensor outputs 16 to the VCU 10, including wheel speed sensors, an ambient temperature sensor, an atmospheric pressure sensor, tire pressure sensors, yaw sensors to detect yaw, roll and pitch of the vehicle, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor (part of a stability control system (SCS)), a brake pedal position sensor, an acceleration pedal position sensor and longitudinal, lateral, vertical motion sensors.

In other embodiments, only a selection of the aforementioned sensors may be used. The VCU 10 also receives a signal from the electronic power assisted steering unit (ePAS unit 12c) of the vehicle to indicate the steering force that is applied to the wheels (steering force applied by the driver combined with steering force applied by the ePAS unit 12c).

The vehicle 100 is also provided with a plurality of sensors which provide discrete sensor outputs 17 to the VCU 10, including a cruise control status signal (ON/OFF), a transfer box or PTU 137 status signal (whether the gear ratio is set to a HI range or a LO range), a Hill Descent Control (HDC) status signal (ON/OFF), a trailer connect status signal (ON/OFF), a signal to indicate that the Stability Control System (SCS) has been activated (ON/OFF), a windscreen wiper signal (ON/OFF), an air suspension status signal (HI/LO), and a Dynamic Stability Control (DSC) signal (ON/OFF).

The VCU 10 includes an evaluation means in the form of an estimator module or processor 18 and a calculation and selection means in the form of a selector module or processor 20. Initially the continuous outputs 16 from the sensors are provided to the estimator module 18 whereas the discrete signals 17 are provided to the selector module 20.

Within a first stage of the estimator module 18, various ones of the sensor outputs 16 are used to derive a number of terrain indicators. In a first stage of the estimator module 18, a vehicle speed is derived from the wheel speed sensors, wheel acceleration is derived from the wheel speed sensors, the longitudinal force on the wheels is derived from the vehicle longitudinal acceleration sensor, and the torque at which wheel slip occurs (if wheel slip occurs) is derived from the motion sensors to detect yaw, pitch and roll. Other calculations performed within the first stage of the estimator module 18 include the wheel inertia torque (the torque associated with accelerating or decelerating the rotating wheels), "continuity of progress" (the assessment of whether the vehicle is starting and stopping, for example as may be the case when the vehicle is travelling over rocky terrain), aerodynamic drag, yaw, and lateral vehicle acceleration.

The estimator module 18 also includes a second stage in which the following terrain indicators are calculated: surface rolling resistance (based on the wheel inertia torque, the longitudinal force on the vehicle, aerodynamic drag, and the longitudinal force on the wheels), the steering force on the steering wheel (based on the lateral acceleration and the output from the steering wheel sensor), the wheel longitudinal slip (based on the longitudinal force on the wheels, the wheel acceleration, SCS activity and a signal indicative of whether wheel slip has occurred), lateral friction (calculated from the measured lateral acceleration and the yaw versus the predicted lateral acceleration and yaw), and corrugation detection (high frequency, low amplitude wheel height excitement indicative of a washboard type surface).

The SCS activity signal is derived from several outputs from an SCS ECU 60, which contains the DSC (Dynamic Stability Control) function, the TC (Traction Control) function, VLA (Vehicle Launch Assist) function, ABS and HDC algorithms, indicating DSC activity, TC activity, ABS activity, brake interventions on individual wheels, and engine torque reduction requests from the SCS ECU to the engine. These SCS outputs may indicate a slip event has occurred and the SCS ECU has taken action to control it. Or, in the case of the TC and VLA functions, they may be used to modify the driver accelerator request to limit the torque so as to avoid wheel slip. The signals from SCS ECU 60 may be provided as a part of the inputs 16. The estimator module 18 also uses the outputs from the wheel speed sensors to determine a wheel speed variation and corrugation detection signal.

On the basis of the windscreen wiper signal (ON/OFF), the estimator module 18 also calculates how long the windscreen wipers have been in an ON state (i.e. a rain duration signal).

The VCU 10 also includes a road roughness module 24 for calculating the terrain roughness based on the air suspension sensors (the ride height sensors) and the wheel accelerometers. A terrain indicator signal in the form of a roughness output signal 26 is output from the road roughness module 24.

The estimates for the wheel longitudinal slip and the lateral friction estimation are compared with one another within the estimator module 18 as a plausibility check.

Calculations for wheel speed variation and corrugation output, the surface rolling resistance estimation, the wheel longitudinal slip and the corrugation detection, together with the friction plausibility check, are output from the estimator module 18 and provide terrain indicator output signals 22, indicative of the nature of the terrain in which the vehicle is travelling, for further processing within the VCU 10.

The terrain indicator signals 22 from the estimator module 18 are provided to the selector module 20 for determining which of a plurality of vehicle subsystem control modes is most appropriate based on the indicators of the type of terrain in which the vehicle is travelling. The most appropriate control mode is determined by analyzing the probability that each of the different control modes is appropriate on the basis of the terrain indicator signals 22, 26 from the estimator module 18 and the road roughness module 24.

The vehicle subsystems 12 may be controlled automatically (referred to as the "automatic mode") in response to a control output signal 30 from the selector module 20 and without the need for driver input. Alternatively, the vehicle subsystems 12 may be operated in response to a manual driver input (referred to as "manual mode") via a Human Machine Interface (HMI) module 32. The subsystem controller 14 may itself control the vehicle subsystems 12a-12e directly via the signal line 13, or alternatively each subsystem may be provided with its own associated intermediate controller (not shown in FIG. 1) for providing control of the relevant subsystem 12a-12e. In the latter case the subsystem controller 14 may only control the selection of the most appropriate subsystem control mode for the subsystems 12a-12e, rather than implementing the actual control steps for the subsystems. The or each intermediate controller may in practice form an integral part of the main subsystem controller 14.

When operating in the automatic mode, the selection of the most appropriate subsystem control mode is achieved by means of a three phase process: (1) for each type of control mode, a calculation is performed of the probability that the control mode is suitable for the terrain over which the vehicle is travelling, based on the terrain indicators; (2) the integration of "positive differences" between the probability for the current control mode and the other control modes; and (3) the program request to the control module 14 when the integration value exceeds a pre-determined threshold or the current terrain control mode probability is zero.

The specific steps for phases (1), (2) and (3) will now be described in more detail. In phase (1), the continuous terrain indicator signals in the form of the road surface roughness output 26 and the outputs 22 from the estimator module 18 are provided to the selector module 20. The selector module 20 also receives the discrete terrain indicators 17 directly from various sensors on the vehicle, including the transfer box status signal (whether the gear ratio is set to a HI range or a LO range), the DSC status signal, cruise control status (whether the vehicle's cruise control system is ON or OFF), and trailer connect status (whether or not a trailer is connected to the vehicle). Terrain indicator signals indicative of ambient temperature and atmospheric pressure are also provided to the selector module 20.

The selector module 20 is provided with a probability algorithm 20a for calculating the most suitable control mode for the vehicle subsystems based on the discrete terrain indicator signals 17 received directly from the sensors and the continuous terrain indicators 22, 26 calculated by the estimator module 18 and the road surface roughness module 24, respectively.

The control modes typically include a grass/gravel/snow control mode (GGS mode) that is suitable for when the vehicle is travelling in grass, gravel or snow terrain, a mud/ruts control mode (MR mode) which is suitable for when the vehicle is travelling in mud and ruts terrain, a rock crawl/boulder mode (RB mode) which is suitable for when the vehicle is travelling in rock or boulder terrain, a sand mode which is suitable for when the vehicle is travelling in sand terrain (or deep soft snow) and a special programs OFF mode (SP OFF mode) which is a suitable compromise mode, or general mode, for all terrain conditions and especially vehicle travel on motorways and regular roadways. Many other control modes are also envisaged.

The different terrain types are grouped according to the friction of the terrain and the roughness of the terrain. For example, it is appropriate to group grass, gravel and snow together as terrains that provide a low friction, smooth surface and it is appropriate to group rock and boulder terrains together as high friction, very high roughness terrains.

For each subsystem control mode, the algorithm 20a within the selector module 20 performs a probability calculation, based on the terrain indicators, to determine a probability that each of the different control modes is appropriate. The selector module 20 includes a tuneable data map which relates the continuous terrain indicators 22, 26 (e.g. vehicle speed, road roughness, steering angle) to a probability that a particular control mode is appropriate. Each probability value typically takes a value of between 0 and 1.

So, for example, the vehicle speed calculation may return a probability of 0.7 for the RB mode if the vehicle speed is relatively slow, whereas if the vehicle speed is relatively high the probability for the RB mode will be much lower (e.g. 0.2). This is because it is much less likely that a high vehicle speed is indicative that the vehicle is travelling over a rock or boulder terrain.

In addition, for each subsystem control mode, each of the discrete terrain indicators 17 (e.g. trailer connection status ON/OFF, cruise control status ON/OFF) is also used to calculate an associated probability for each of the control modes, GGS, RB, Sand, MR or SP OFF. So, for example, if cruise control is switched on by the driver of the vehicle, the probability that the SP OFF mode is appropriate is relatively high, whereas the probability that the MR control mode is appropriate will be lower.

For each of the different sub system control modes, a combined probability value, Pb, is calculated based on the individual probabilities for that control mode, as described above, as derived from each of the continuous or discrete terrain indicators 17, 22, 26.

In the following equation, for each control mode the individual probability as determined for each terrain indicator is represented by a, b, c, d . . . n. The combined probability value, Pb, for each control mode is then calculated as follows:

$$Pb=(a.b.c.d. \ldots n)/((a.b.c.d. \ldots n)+(1\text{-}a).(1\text{-}b).(1\text{-}c).(1\text{-}d). \ldots (1\text{-}n))$$

Any number of individual probabilities may be input to the probability algorithm 20a and any one probability value input to the probability algorithm may itself be the output of a combinational probability function. Once the combined probability value for each control mode has been calculated, the subsystem control program corresponding to the control mode with the highest probability is selected within the selector module 20 and an output signal 30 providing an indication of this is provided to the subsystem control module 14. The benefit of using a combined probability function based on multiple terrain indicators is that certain indicators may make a control mode (e.g. GGS or MR) more or less likely when combined together, compared with basing the selection on just a single terrain indicator alone.

A further control signal 31 from the selector module 20 is provided to a control module 34.

In phase (2), an integration process is implemented continually within the selector module (20) to determine whether it is necessary to change from the current control mode to one of the alternative control modes. The first step of the integration process is to determine whether there is a positive difference between the combined probability value for each of the alternative control modes compared with the combined probability value for the current control mode. By way of example, assume the current control mode is GGS with a combined probability value of 0.5. If a combined probability value for the sand control mode is 0.7, a positive difference is calculated between the two probabilities (i.e. a positive difference value of 0.2). The positive difference value is integrated with respect to time. If the difference remains positive and the integrated value reaches a predetermined change threshold (referred to as the change threshold), or one of a plurality of predetermined change thresholds, the selector module 20 determines that the current terrain control mode (for GGS) is to be updated to a new, alternative control mode (in this example, the sand control mode). A control output signal 30 is then output from the selector module 20 to the subsystem control module 14 to initiate the sand control mode for the vehicle subsystems.

In phase (3), the probability difference is monitored and if, at any point during the integration process, the probability difference changes from a positive value to a negative value, the integration process is cancelled and reset to zero. Similarly, if the integrated value for one of the other alternative control modes (i.e. other than sand), reaches the predetermined change threshold before the probability result for the sand control mode, the integration process for the sand control mode is cancelled and reset to zero and the other alternative control mode, with a higher probability difference, is selected.

Vehicle Launch Assist

As mentioned above, the SCS ECU 60 may include a traction control (TC) function that may be implemented in any suitable manner to limit the torque applied to the driven wheels so as to reduce wheel slip. The TC function may be implemented by filtering the driver accelerator request generated when the driver presses on the accelerator pedal. The generation of this filtered representation of the driver accelerator request and its use to limit the torque applied to the wheels is known. However, the use of the TC function may not be suitable on certain terrain or at lower speeds such as when accelerating from rest.

For example, when driving away from rest on dry, soft sand with large torque demands, the wheels of a vehicle can spin and dig into the sand. This can cause the vehicle to sink into the sand and become stuck. In some circumstances the traction control (TC) function may be unable to prevent or remedy this situation. This is because all four wheels 111-115 may slip at the same rate so that no slip is detected, and therefore the TC function does not intervene and reduce powertrain torque and/or apply braking.

The amount of torque that can be delivered by a powertrain 129 without excessive wheel slip occurring depends on a number of factors including tire contact area and sand type.

Advanced TC systems may employ an accelerometer to determine vehicle speed independently of wheel speed. However even in such cases, the SCS ECU implementing the TC function takes a finite amount of time to register wheel speed and calculate vehicle speed based on a signal from the accelerometer. Wheel spin may therefore not be detected initially and by the time the TC function does intervene the wheels 111-115 may have sunk into the sand and fail to climb back to the surface.

In order to overcome this problem, the SCS ECU 60 is operable to implement a Vehicle Launch Assist (VLA) function, which may also be referred to as a 'sand launch' function. And, while the embodiment shown in FIG. 2 includes the SCS subsystem 60 as separate from the VCU 10, it will be appreciated that the functions of the SCS subsystem may be incorporated into the VCU 10. Given that both the VCU 10 and SCS subsystem 60 are vehicle control systems, the following discussion of the TC and VLA functions will be carried out on the basis that the SCS subsystem is incorporated in the VCU 10 rather than being a separate module.

The VCU 10 implements the VLA function by reducing a rate of response of the powertrain 129 to torque demand and setting a limit to the maximum allowable value of powertrain torque that may be applied to the wheels 111-115. This reduces a risk of excessive wheel spin when torque is applied to one or more wheels 111-115.

In some embodiments this is achieved by applying a filter to an accelerator control signal by means of which driver torque demand is determined. The accelerator control signal may be received from an accelerator pedal 161. In vehicles having speed control functionality such as a crawl function the filter may be applied to a speed control system torque demand, or accelerator control signal generated by the speed control system. A signal from other driver assistance systems operable to control powertrain torque demand may also be subject to the filter when active, for example a signal from a queue assist system, a creep control system or the like.

In some embodiments, in addition or instead, a maximum allowable rate of increase in powertrain torque 129 may be limited to a prescribed value.

It is to be understood that the one or more constraints imposed by the VLA function are determined in dependence on one or more parameters, optionally including one or more parameters dependent on the surface on which the vehicle is supported. In particular, they are determined in dependence on one or more characteristics of the contact between the vehicle 100 and the surface. The contact between the vehicle 100 and the surface may be characterised by the amount of 'purchase' (or tractive force) that the vehicle 100 may obtain without inducing excessive slip of one or more wheels.

Determination of the amount of tractive force that may be applied may be made by reference to one or more selected from amongst the type of material of which the surface is composed (e.g. grass, gravel, snow, sand, rock), a coefficient of friction between the vehicle wheel and the surface, tire pressure, suspension travel, suspension articulation, gradient, status of a locking differential, selected transmission gear and selected PTU gear ratio (high or low). Other parameters are useful in addition or instead.

Other arrangements are also useful.

In some embodiments the VLA function may be implemented (triggered, or 'called') when a prescribed set of conditions are met. In the present embodiment the conditions are: 1) the vehicle speed is less than a prescribed value (5 km/h in the present embodiment although other speeds are also useful); 2) driver demanded torque or accelerator position is greater than a prescribed value; and 3) the user has manually selected the Sand control mode.

In some embodiments the VLA function is always active, the function being arranged to apply different forms of response of the powertrain to torque demand and different powertrain torque limits depending on whether the conditions described above are met.

Other conditions are also useful in addition or instead. The VLA function may be effectively disabled by setting torque limits that are relatively high when the user has not manually selected the Sand mode.

The actual response of the powertrain 129 to torque demand applied by the VLA function and powertrain torque limit that is imposed may depend on one or more parameters. In the present embodiment the response and torque limit may depend at least in part on the selected gear of the transmission 124 and whether the PTU is in the low ratio range or high ratio range.

It is to be understood that the value of vehicle speed required under condition 1) may correspond to the value below which a TC function or the like is unable to intervene and prevent or reduce excessive wheel slip. Such a function may be inactive below that speed due for example to an inability of the system to measure vehicle and/or wheel speed accurately below that speed. This may be due for example to lack of availability of a sufficiently accurate wheel speed sensor.

If any of conditions 1 to 3 are not met, then, in at least some embodiments, the VLA function does not reduce the rate of response of the powertrain 129 to torque demand or apply a limit to the amount of torque that may be applied by the powertrain 129. In other embodiments, only conditions 1 and 2 need be met to utilize the VLA function, and other embodiments may use fewer or different conditions to determine whether to utilize the VLA function.

In some embodiments condition 3) may include one or more other control modes in addition or instead. One or more characteristics of the VLA function that is implemented may depend on the selected control mode.

In some embodiments, a primary VLA function is implemented when conditions 1 to 3 are met. If all of the conditions are met except for condition 3) and the VCU 10 is in automatic mode (whereby the most appropriate control mode is selected automatically) a secondary VLA function may be implemented instead. In some embodiments the secondary VLA function differs from the primary VLA function in that a less severe limitation or limitations are placed on vehicle response when a demand for an increase in powertrain torque is made. In some embodiments, the amount by which the rate of response of the powertrain 129 to torque demand is limited is reduced relative to that in the case of the primary VLA function. That is, the reduction in powertrain torque demand imposed is not as severe as that imposed by the primary VLA function.

In some embodiments, when the VCU 10 is operating in automatic mode and the VCU 10 has selected the Sand mode, the VCU 10 may be configured to allow the primary VLA function to be implemented only if one or more conditions are met that are in addition to conditions 1 and 2 listed above. The further one or more conditions may be conditions that allow further confirmation to be obtained that the vehicle 100 is operating on sand. In the absence of such confirmation, the secondary VLA function may be implemented.

In embodiments having only a primary VLA function, the VCU 10 may be configured to allow the primary VLA function to be implemented if the further confirmation of operation on sand is obtained.

It is to be understood that the VLA function (and secondary VLA function where one is provided) may be arranged to cancel operation when vehicle speed exceeds a prescribed value. Once vehicle speed exceeds the prescribed value the VCU 10 may be configured to blend the powertrain torque demand applied by the VLA function with that demanded by the user (the amount demanded by the user typically being higher). Thus in embodiments in which a rate of increase in powertrain torque is limited, the VCU 10 may be arranged to blend the rate of increase of powertrain torque allowed by the VLA function with that demanded by a user once vehicle speed exceeds the prescribed value.

Similarly, in embodiments arranged to limit the maximum allowable powertrain torque, the VCU 10 may be arranged to blend the maximum value of powertrain torque allowed by the VLA function with that demanded by a user once vehicle speed exceeds the prescribed value. Thus, the amount of torque provided is increased until it matches that demanded by the user.

Figure 3:
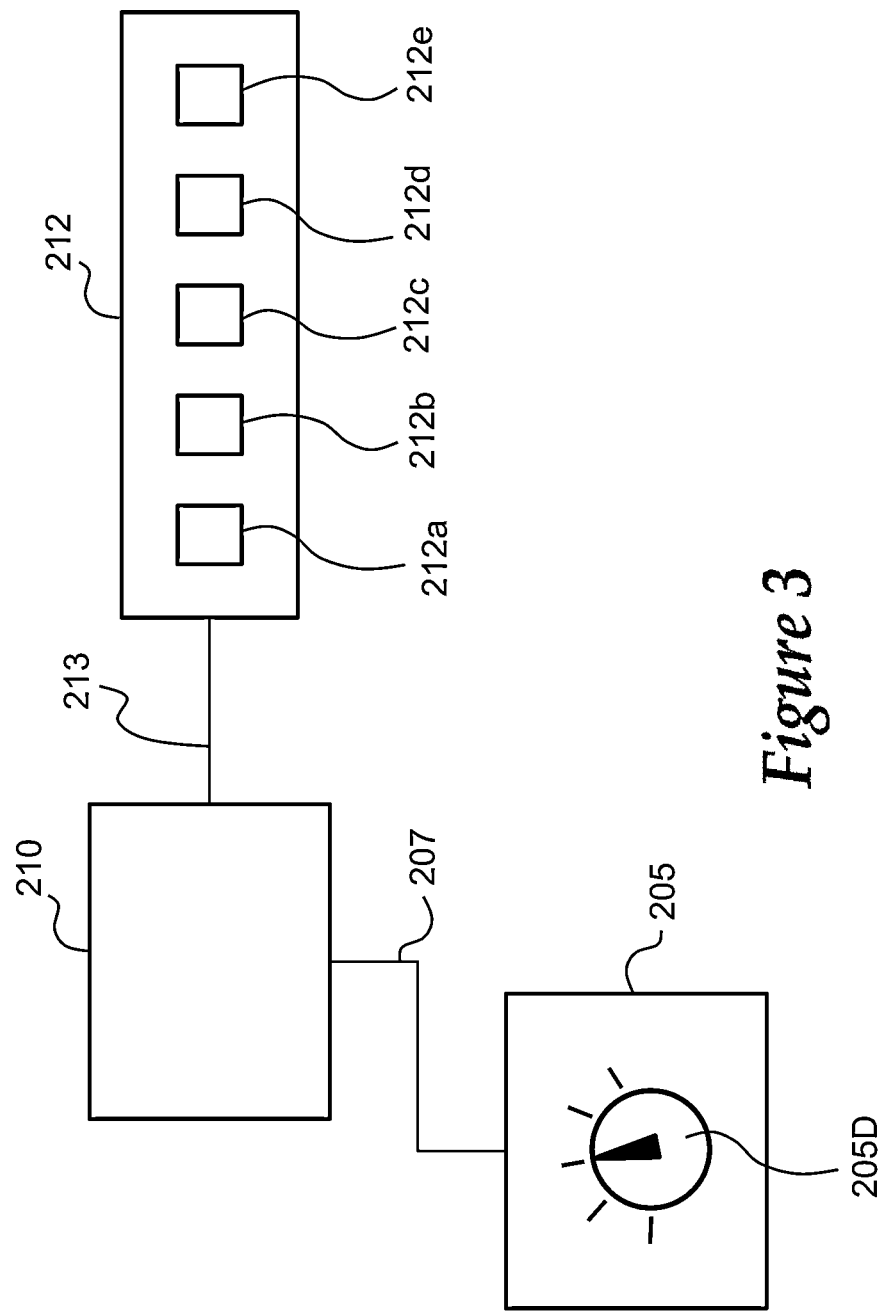
FIG. 3 is a block diagram of a second embodiment of a vehicle control system in accordance with an embodiment of the invention, including various vehicle subsystems under the control of the vehicle control system.

FIG. 3 shows a VCU 210 according to a further embodiment of the invention. The VCU 210 differs from the VCU 10 of FIG. 2 in that it is operable in a manual mode only and not an automatic mode. That is, the VCU 210 is not capable of determining the most appropriate control mode in which subsystems 212 of a vehicle should be operated.

The VCU 210 is arranged to receive a control input via signal line 207 from a manual selector module 205. Selector module 205 has a rotatable dial 205D by means of which a user may select a control mode in which the subsystems 212 are to be operated. The selectable control modes correspond to those described above with respect to the embodiment of FIG. 2 and include a grass/gravel/snow control mode (GGS mode), a mud/ruts control mode (MR mode), a rock crawl/boulder mode (RB mode), a sand mode and a special programs OFF mode (SP OFF mode).

The VCU 210 is configured to control the vehicle subsystems 212 to operate in the control mode selected by the selector module 205.

In the embodiment of FIG. 3 the VCU 210 is operable to activate a VLA function under certain conditions. These conditions are: 1) the vehicle speed is less than a prescribed value (5 km/h in the present embodiment although other speeds are also useful); 2) driver demanded torque or accelerator position is greater than a prescribed value; and 3) the user has manually selected the Sand control mode.

In some embodiments the VLA function is always active, the function being arranged to apply different forms of response of the powertrain to torque demand and different powertrain torque limits depending on whether the conditions described above are met. Other conditions are also useful in addition or instead. The VLA function may be effectively disabled by setting torque limits that are relatively high when the user has not manually selected the Sand mode.

As described with respect to the previous embodiment, it is to be understood that the value of vehicle speed required under condition 1) may correspond to the value below which a TC function or the like is unable to intervene and prevent or reduce excessive wheel slip. Such a function may be inactive below that speed due for example to an inability of the system to measure vehicle and/or wheel speed accurately below that speed. This may be due for example to lack of availability of a sufficiently accurate wheel speed sensor.

If any of conditions 1 to 3 are not met, then, in at least some embodiments, the VLA function does not reduce the rate of response of the powertrain 129 to torque demand or apply a limit to the amount of torque that may be applied by the powertrain 129. In other embodiments, only conditions 1 and 2 need be met to utilize the VLA function, and other embodiments may use fewer or different conditions to determine whether to utilize the VLA function.

In some embodiments condition 3) may include one or more other control modes in addition or instead. One or more characteristics of the VLA function that is implemented may depend on the selected control mode.

As in the case of the embodiment of FIG. 2, in the embodiment of FIG. 3 the VCU 210 is operable to determine the one or more constraints that are to be imposed by the VLA function in dependence on the surface on which the vehicle is supported. In particular, the one or more constraints are determined in dependence on one or more characteristics of the contact between the vehicle 100 and the surface.

As noted above, the contact between the vehicle 100 and the surface may be characterized by the amount of 'purchase' (or tractive force) that the vehicle 100 may obtain without inducing excessive slip of one or more wheels. Determination of the amount of tractive force that may be applied may be made by reference to one or more selected from amongst the type of material of which the surface is composed (e.g. grass, gravel, snow, sand, rock), a coefficient of friction between the vehicle wheel and the surface, tire pressure, suspension travel, suspension articulation, gradient, status of a locking differential, selected transmission gear and selected PTU gear ratio (high or low). Other parameters are useful in addition or instead. Other arrangements are also useful.

At least some embodiments of the present invention have the advantage that when the VLA system is activated, it is activated in an intelligent manner whereby the one or more constraints imposed thereby are tailored to the ability of a vehicle to generate tractive force between wheel and terrain. It is to be understood that because the constraints are determined in response to indications in respect of an actual tractive force obtainable, the magnitude of the one or more constraints imposed are not too great and not too small. This is in contrast to a system in which a blanket constraint is applied whenever a given subsystem control mode is selected, regardless of the actual amount of tractive force obtainable.

VLA-TC Handover

The VLA function is primarily utilized at low speed (e.g., when accelerating from rest) and sometimes only in certain terrain conditions, such as when on sand. Once the vehicle achieves a speed above a predetermined value, or once it is otherwise desirable to exit the VLA function, VCU 10 may switch to use of the TC function. To avoid excessive torque during the handover between functions, VCU 10 may include a process that prevents the rate of torque increase from exceeding that permitted by the TC function for the current conditions (e.g., based on the current driver accelerator request and torque level at the point of handover).

This handover may be carried out by allowing the VCU 10 to obtain the maximum acceptable torque calculated by the TC function ("TC Maximum Torque") and compare it with the maximum acceptable torque calculated by the VLA function ("VLA Maximum Torque"), with the system then generating and outputting a powertrain control signal to deliver torque to the wheels that is based on the lower of the two; that is, based on which value will provide the lower rate of increase of torque. This calculation and comparison may be done continuously from the beginning of the driver accelerator request in which case the VLA and TC functions are essentially always active (being calculated) with the system then selecting the lesser value to limit the rate of increase of torque so as to reduce wheel slip partially or completely.

Figure 4A:
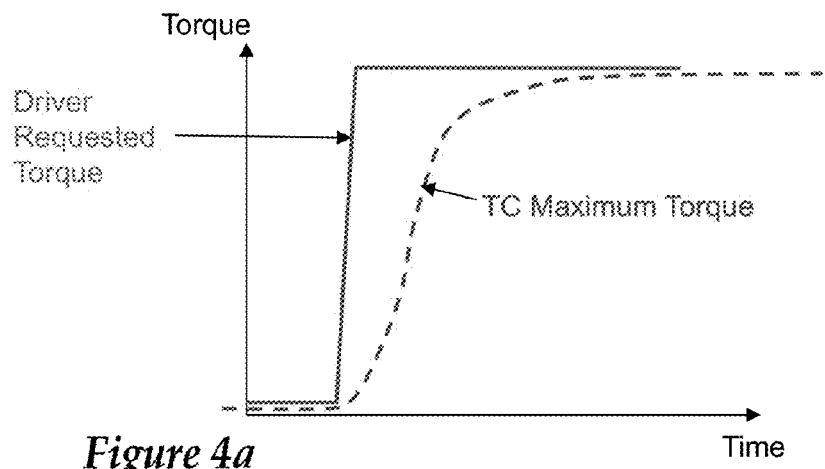
FIGS. 4*a*-4*c* are plots of torque curves, with FIGS. 4*a* and 4*b* showing separate maximum torque curves generated for traction control and vehicle launch assist functions of the vehicle control system of FIG. 2, and FIG. 4*c* showing a resulting torque curve formed by a combination of the curves from FIGS. 4*a* and 4*b*.
Figure 4B:
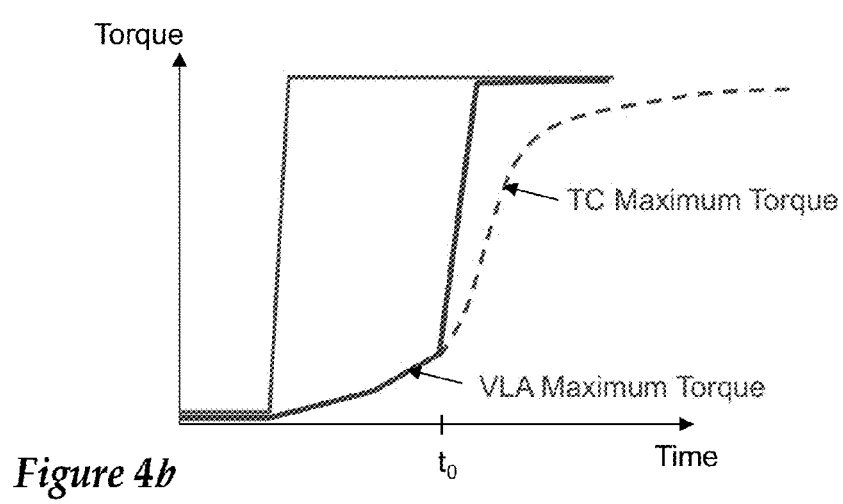
Figure 4C:
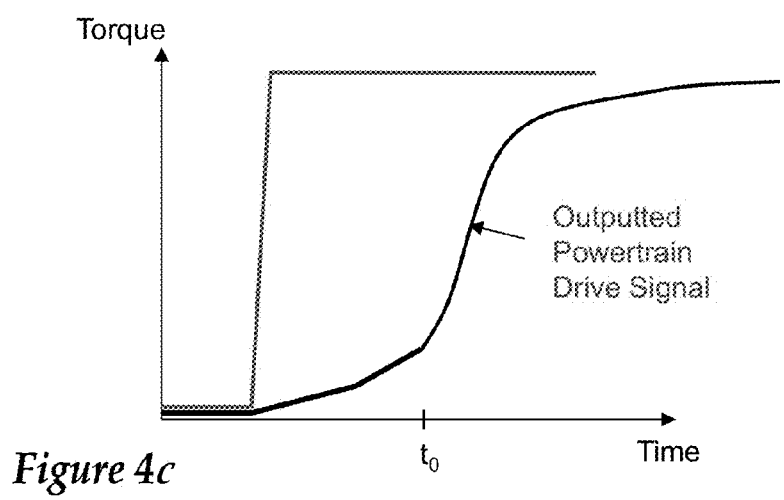

This may be seen with reference to FIGS. 4a-4c. FIG. 4a shows driver requested torque in solid line (e.g., the driver accelerator request) and the TC Maximum Torque in broken line. This TC Maximum Torque may be calculated in known ways, such as by filtering of the driver accelerator request, or in any other manner suitable for use on the vehicle. FIG. 4b shows the VLA Maximum Torque in solid line which at time $t_0$, exceeds the continuously-calculated TC Maximum Torque which is superimposed on the graph in broken line for reference. Accordingly, FIG. 4c shows the final outputted powertrain drive signal which initially is taken from the VLA function (having a lesser torque value than the TC function) up to time $t_0$, but then follows the TC Maximum Torque after time $t_0$. The VLA function may be calibrated such that once the vehicle reaches a state at which VLA control is considered to be no longer needed (e.g., time $t_0$), the VLA rate of torque increase is very high, such that in most cases a switch to the TC "filtered" torque curve will occur.

Thus, from these graphs it will be seen that the VLA and TC functions each operate to generate a torque profile based on the driver accelerator request. The torque profiles represent the TC and VLA Maximum Torques and are used by the VLA and TC functions to generate drive signals (the TC and VLA Maximum Torques), each at a value that limits the actually-applied torque to below a requested torque value representing the driver accelerator request. The TC and VLA Maximum Torque drive signals are both time-varying signals. In the case of the TC Maximum Torque, that drive signal may be based solely on the driver accelerator request, or may include one or more vehicle operating conditions in determining its torque profile. For the VLA Maximum Torque, that drive signal may use terrain information (inputted manually by the driver such as by selecting a "Sand Mode", or automatically by the vehicle based on sensor input), and may use other vehicle operating conditions such as vehicle speed, tire pressure, transmission setting, as will be described further below.

Figure 5:
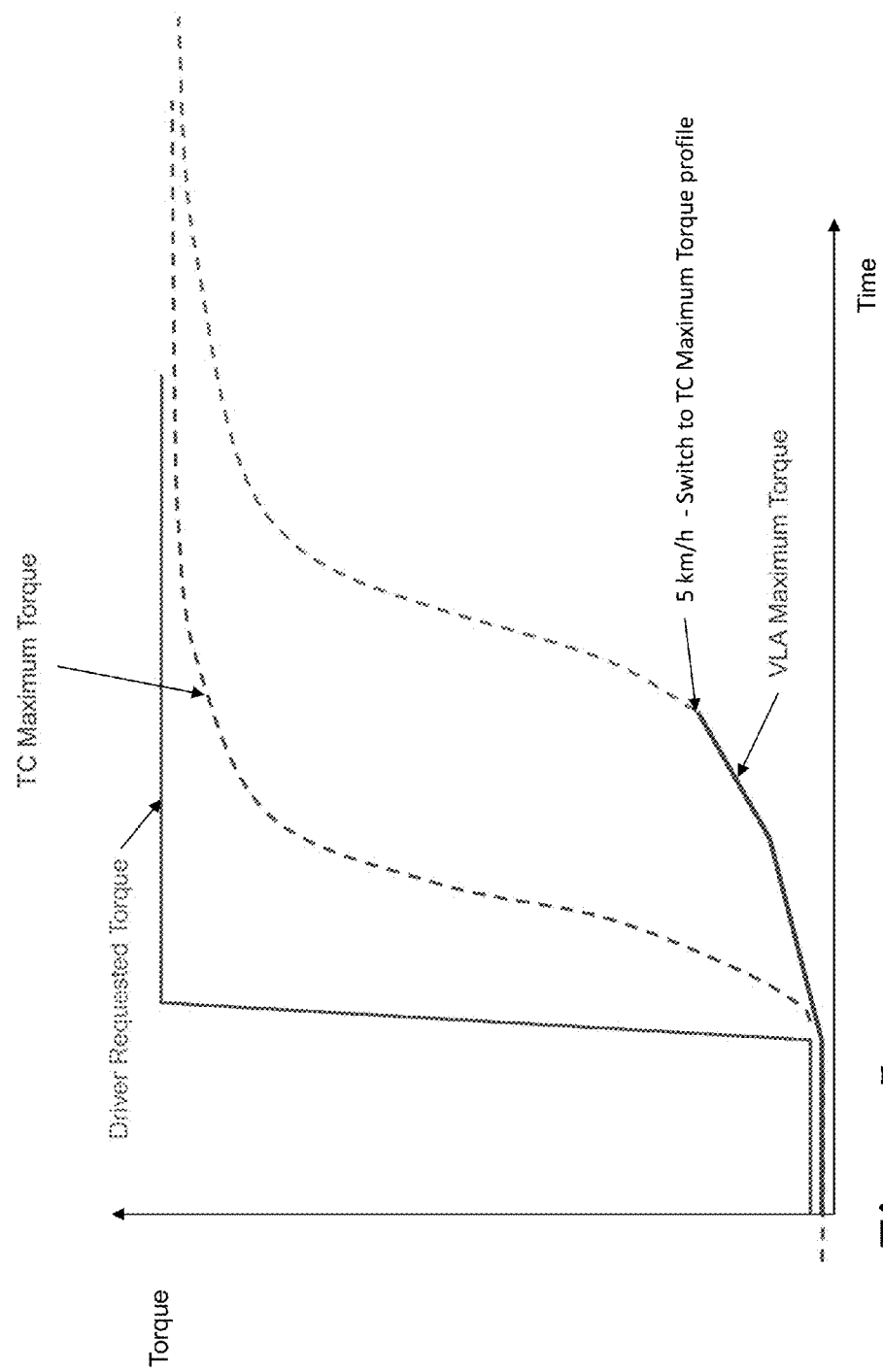
FIG. 5 depicts another approach for generating a maximum torque curve used to generate a powertrain control signal used to provide power to the vehicle wheels.

FIG. 5 depicts a similar graph which, rather than calculating and comparing both the VLA Maximum Torque and TC Maximum Torque at all times, instead uses the VLA Maximum Torque up until the vehicle reaches a predetermined speed, such as 5 km/h, at which point it switches fully to the TC Maximum Torque that is calculated based on the filtered driver accelerator request and the current torque value existing at the handover point. Thus, this approach may be carried out the same as described above in connection with FIGS. 4a-4c except that a speed based handover is used rather than a continuous "calculate and compare" method using the two functions.

Figure 6:
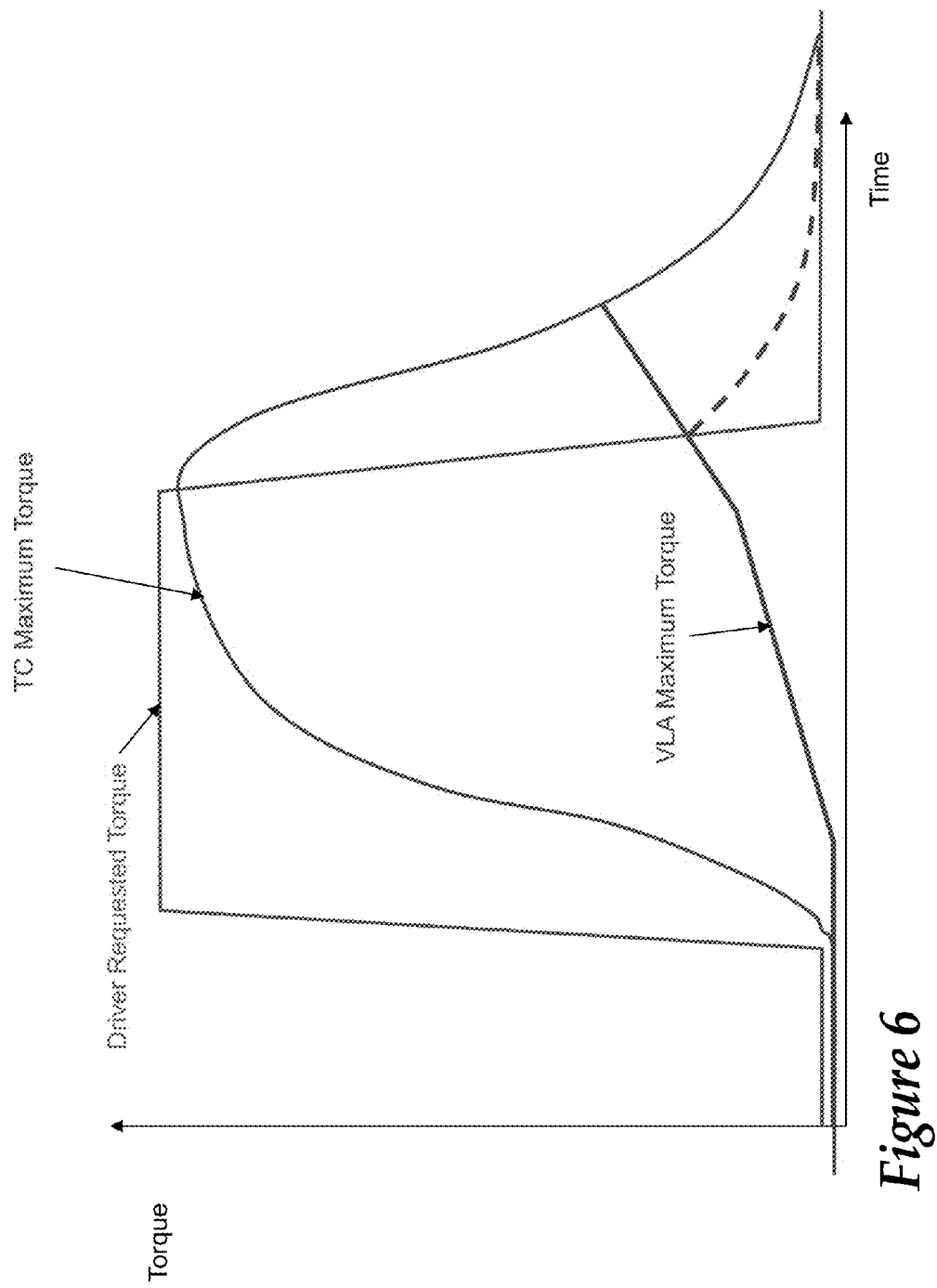
FIG. 6 shows the resulting torque curve following a drop in a driver accelerator request for power.

The above-described processes for using both the VLA and TC functions have the advantage that handover between the two functions does not involve an excessive rate of torque increase that might otherwise cause wheel slip. A further advantage occurs when the driver accelerator request goes away during the process. As indicated in FIG. 6, if the VCU 10 is utilizing the VLA Maximum Torque in response to a driver accelerator requested torque that is too high, and the driver request goes away during this time, then rather than a continuing increase in torque from the powertrain drive signal (due to the VLA Maximum Torque increasing but still below the TC Maximum Torque), instead the now calculated TC Maximum Torque (as a result of the dropped accelerator request) shown in broken lines is less than the VLA Maximum Torque so that the falling curve is used to generate the powertrain control signal which is ultimately used to deliver torque to the wheels. In this way, the torque commanded by the control system (i.e., the outputted powertrain control signal) never increases when it is already above the driver requested torque.

Figure 7:
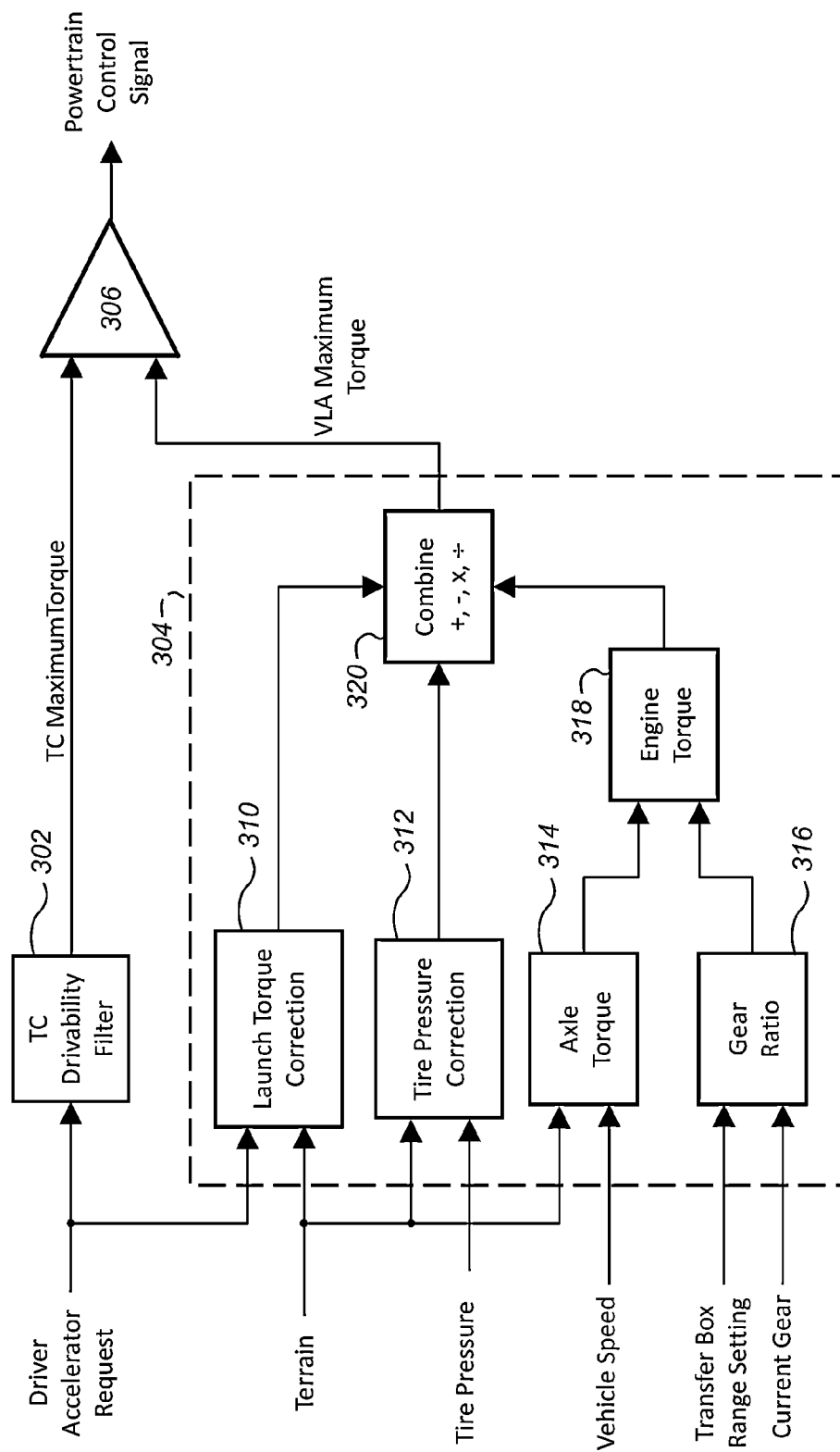
FIG. 7 depicts the VLA function generation using various vehicle operating conditions.

Turning now to FIG. 7 there is shown a block diagram representing the TC and VLA functions as they might be carried out by the VCU 10 using driver and vehicle operating conditions inputs.

In general, the driver accelerator request is provided to both the TC function 302 and VLA function 304, which output a TC Maximum Torque and a VLA Maximum Torque, respectively. These are compared by comparator 306 and the lesser of the two is provided as the powertrain drive signal that is used to control engine power to the driven wheels. The TC function 302 is a drivability function that smoothes the driver accelerator request in a manner that helps avoid wheel slip. A conventional drivability filter function may be used for this purpose, and feedback from the generated powertrain drive signal may be provided to the TC function 302 for stability and/or smoothness in carrying out that function.

The VLA function 304 is shown in greater detail. It receives signals from sensors and other subsystems that provide it with the following information: surface terrain condition (e.g., sand, ice, pavement, etc. as well as gradient and other terrain features), tire pressure, vehicle speed, transfer box range setting (e.g., 4 wheel high, etc.), and current gear of the transmission. These inputs comprise vehicle operating conditions useful for determining the maximum allowable torque when the VLA function is active to limit the powertrain control signal. In other embodiments, additional vehicle operating conditions may be used that are not shown in FIG. 7, or something less than those shown in FIG. 7 may be used. Additional useful inputs may include suspension travel, suspension articulation, as well as longitudinal, lateral, vertical, yaw, pitch, and/or roll acceleration, to name just a few.

Various ways of utilizing the inputs to determine a VLA Maximum Torque may be used and will become apparent to those skilled in the art based on the information herein, and FIG. 7 provides one example of how this may be done. The driver accelerator request is put into a launch torque correction function 310 that modifies the accelerator request based on the terrain information—for example, by greatly reducing the allowable torque in the case of a sand ground surface. The terrain information is also used in conjunction with tire pressure using a tire correction function 312 so that the relative inflation level of the tires (and thus their surface grip) may be taken into account. The terrain information is also combined with vehicle speed by an axle torque function 314 to determine an allowable axle torque. The transfer box setting and current gear inputs are combined using a function 316 to determine a gear ratio which is combined at 318 with the determined axle torque to determine engine torque. This in turn is combined at 320 with the terrain-corrected driver accelerator request and tire pressure correction from respective functions 310 and 312 to produce the final VLA Maximum Torque that is sent to comparator 306.

In this way it may be seen that VCU 10 constantly calculates by the TC function and VLA function based on the driver accelerator request, with the system then selecting the lesser of the two for use in generating the powertrain control signal that determines the torque applied to the wheels. And by designing the VLA function so as to have a relatively high torque once higher vehicle speeds are reached (e.g., above 5 km/h), the system will automatically and seamlessly switch over to TC control once the vehicle is moving at speed.

As will be appreciated by those skilled in the art, the functions shown in FIG. 7 that achieve the torque curves shown in FIGS. 4a-4c, 5, and 6, are implemented by VCU 10 in hardware under software control. To do so, VCU 10 includes suitable electronics in the form of at least one processor operating under software control to carry out the functions of FIG. 7, with the inputs being received as electrical signals on inputs to the VCU 10, and the outputs being sent in the form of electrical signals to the various subsystems such as engine management system 12a. The data used for carrying out the functions may be hardcoded into the software as equations or may be obtained from lookup tables of data. Details of the physical hardware and software implementation used to carry out the disclosed functions are not shown in the drawings or discussed herein since the selection of hardware components, programming language and architecture are well within the level of skill in the art.

In the illustrated embodiment, the powertrain control signal outputted by the VLA/TC functions may be used to control engine (motor) operation, such as by controlling the throttle or other fuel supply aspects for an internal combustion engine or by controlling electric motor power for an electric vehicle. In other embodiments, torque limiting based on the output of the VLA/TC functions may be assisted using other subsystems, such as by applying brake force to the wheels.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle control system for a motor driven vehicle, the system comprising:
   at least one processor configured to:
      reduce wheel slip at lower speeds via a vehicle launch assist (VLA) process;
      reduce wheel slip at higher speeds via a traction control (TC) process, each of the VLA and TC processes affecting operation of one or more vehicle subsystems that control at least one powertrain parameter, and each operating in response to a driver accelerator request to generate a drive signal that controls torque delivered to at least one wheel of the vehicle;
      generate, based on the driver accelerator request, a VLA drive signal at a first calculated value that limits the torque to below a requested torque value representing the driver accelerator request;
      generate, based on the driver accelerator request, a TC drive signal at a second calculated value that limits the torque to below the requested torque value;
      select the drive signal corresponding to the lesser of the first and second values; and
      output a powertrain drive signal based on the selected drive signal that corresponds to the lesser of first and second calculated values to control the torque delivered to the one or more wheels of the vehicle.

2. The vehicle control system of claim 1, wherein the first calculated value of the VLA drive signal is a time-varying signal generated based on the driver accelerator request and one or more additional vehicle operating conditions.

3. The vehicle control system of claim 2, wherein the one or more additional vehicle operating conditions comprise one or more of the following operating conditions: tire pressure, vehicle speed, surface terrain, transfer case range, and current transmission gear.

4. The vehicle control system of claim 3, wherein the first calculated value is determined using a look-up table containing values associated with the one or more vehicle operating conditions.

5. The vehicle control system of claim 1, wherein the VLA and TC processes are implemented such that the first calculated value is less than the second calculated value when the vehicle is accelerated from rest.

6. The vehicle control system of claim 1, wherein the VLA and TC processes are implemented such that the second calculated value is less than the first calculated value when the vehicle is above a predetermined speed.

7. The vehicle control system of claim 1, wherein the VLA process is used only when the vehicle speed is below a predetermined speed, whereby the powertrain drive signal is based on the second calculated value when the vehicle is above the predetermined speed.

8. The vehicle control system of claim 1, wherein the second calculated value of the TC drive signal is a time-varying signal that is a filtered representation of the driver accelerator request.

9. A vehicle having at least one motor coupled to drive the at least one wheel and the vehicle control system of claim 1, wherein the powertrain drive signal is used to control power provided by the at least one motor to the at least one wheel.

10. The vehicle control system of claim 1, the at least one processor being configured to independently and simultaneously determine the first and second calculated values to determine the lesser of the first and second calculated values.

11. A method of controlling maximum torque delivered to one or more wheels of a vehicle, comprising:
   calculating, by at least one processor of a vehicle control system, a first maximum torque based on a driver accelerator request and on one or more operating conditions of the vehicle;
   calculating, by the at least one processor, a second maximum torque as a filtered representation of the driver accelerator request; and
   controlling, by the at least one processor, the maximum torque delivered to the one or more wheels of the vehicle to below a requested torque value representing the driver accelerator request based on the lesser of the first and second calculated maximum torques.

12. The method of claim 11, wherein step of calculating the first maximum torque comprises calculating the first maximum torque based on the driver accelerator request and vehicle speed.

13. The method of claim 11, wherein step of calculating the first maximum torque comprises calculating the first maximum torque based on the driver accelerator request, vehicle speed, and at least one transmission system input.

14. A vehicle control system, including at least one processor, programmed to carry out the method of claim 11.

15. A vehicle having at least one motor coupled to drive at least one wheel and the vehicle control system of claim 14, wherein the vehicle control system controls power supplied by the at least one motor to the at least one wheel.

16. The method of claim 11, wherein determining the lesser of the first and second calculated maximum torques includes independently and simultaneously determining the first and second calculated maximum torques.

17. The method of claim 11, further comprising using a VLA process only when a vehicle speed is below a predetermined speed, whereby a powertrain drive signal is based on the second calculated maximum torque when the vehicle is above the predetermined speed.

18. An electronic processor for a vehicle that, when operated under software control, controls a maximum torque being delivered to one or more wheels of the vehicle, the electronic processor being configured to:

calculate a first maximum torque based on a driver accelerator request and one or more operating conditions of the vehicle;
calculate a second maximum torque as a filtered representation of the driver accelerator request; and
control the maximum torque delivered to the one or more wheels to below a requested torque value representing the driver accelerator request based on the lesser of the first and second calculated maximum torques.

19. The electronic processor of claim 18, wherein the step of calculating the first maximum torque comprises calculating the first maximum torque based on the driver accelerator request and vehicle speed.

20. The electronic processor of claim 18, wherein the step of calculating the first maximum torque comprises calculating the first maximum torque based on the driver accelerator request, vehicle speed, and at least one transmission system input.

21. A vehicle comprising the electronic processor of claim 18.

* * * * *